Sept. 26, 1933.  B. KINDIG  1,928,565
TEST DEVICE
Filed March 30, 1932
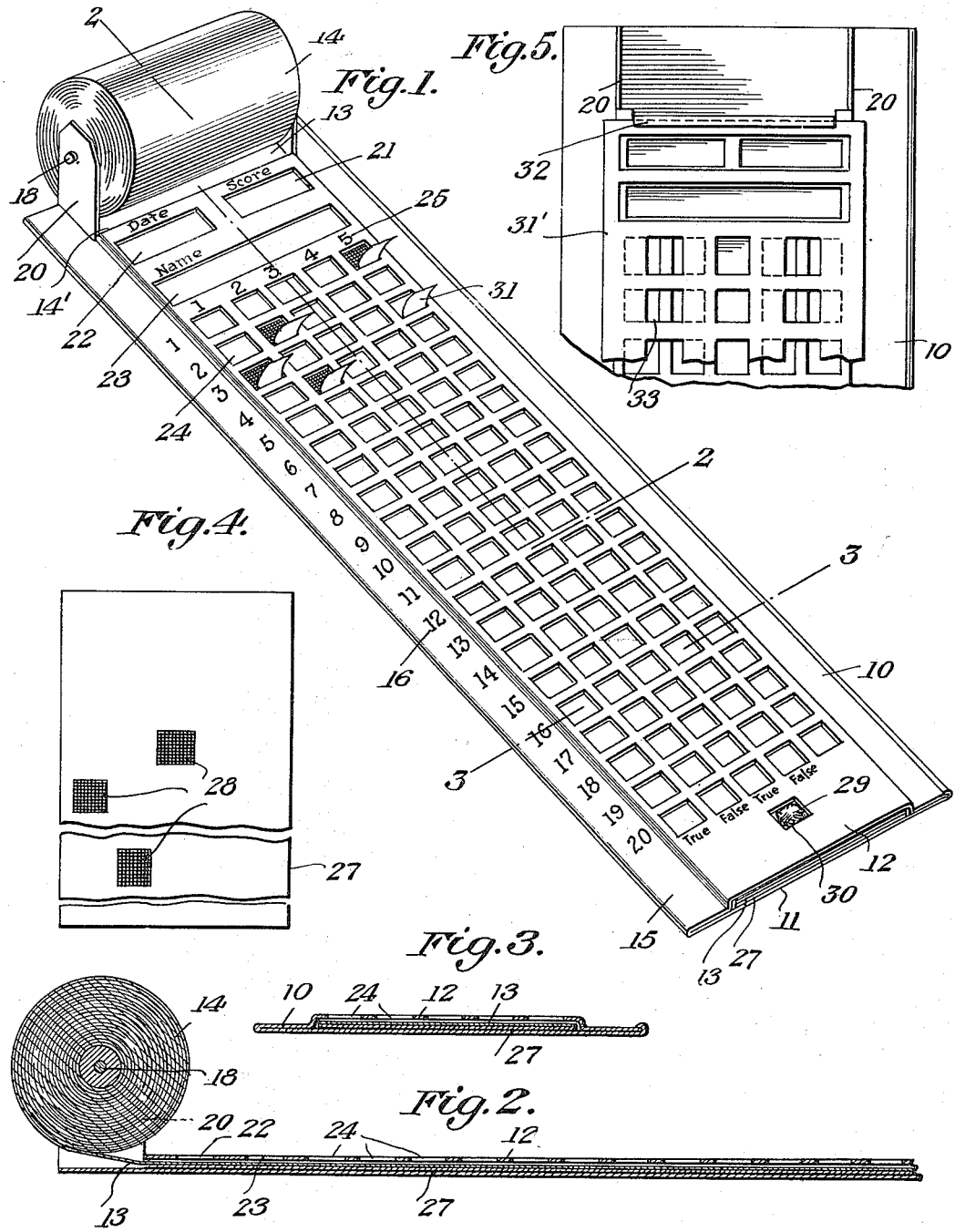
Bruce Kindig
INVENTOR
BY Victor J. Evans & Co.
ATTORNEYS Patented Sept. 26, 1933

1,928,565

UNITED STATES PATENT OFFICE 1,928,565

TEST DEVICE

Bruce Kindig, Medicine Lodge, Kans.

Application March 30, 1932. Serial No. 602,086

2 Claims. (Cl. 35—12)

The invention relates to a test device and more particularly to a self-checking test device.

The primary object of the invention is the provision of a device of this character wherein a student or other person when being subjected to a test under a questionnaire or subject for examination, either educational or non-educational, through judgment or choice will record answers and be enabled to check the same for the purpose of enlightening the person subjected to the test as to the correctness or incorrectness of such judgment or choice under the recordation thereof.

Another object of the invention is the provision of a device of this character wherein school tests and exercises based on different subjects and in fact any arrangement of data requiring a recorded answer or entry can be so arranged that a pupil or other person may indicate a judgment or choice, while at the same time the correctness or incorrectness of such judgment or choice is apparent, thereby enabling a person giving the test to ascertain a score and thus qualify such person taking the test accordingly and at the same time the person taking the test may check his judgment or choice of such subject or exercise and thus at a glance have cognizance of the accuracy of such judgment or choice and the extent of correctness or incorrectness under the judgment or choice.

A further object of the invention is the provision of a device of this character wherein the same is for the purpose of adapting it to existing "true" and "false" objective tests and to enable the scoring to be made with little effort on the part of such person giving the test or tests and the degree of accuracy or inaccuracy of the persons taking the test may be determined with dispatch.

A still further object of the invention is the provision of a device of this character which is comparatively simple in construction, readily and easily operated, thoroughly reliable and efficient in its purpose, strong, durable, readily portable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the appended claims.

In the accompanying drawing:—

Figure 1 is a perspective view of the device constructed in accordance with the invention showing certain judgments or choice executed under the use of the device.

Figure 2 is a sectional view on the line 2—2 of Figure 1.

Figure 3 is a sectional view on the line 3—3 of Figure 1.

Figure 4 is a fragmentary plan view of the test medium or card.

Figure 5 is a fragmentary plan view of a slight modification of the device.

Similar reference characters indicate corresponding parts throughout the several views in the drawing.

Referring to the drawing in detail, the device comprises a body 10 preferably made from sheet metal and bent on itself to provide a bottom 11, an upstanding housing 12 forming a guideway therein for a strip of paper 13, the latter being normally in a roll 14. The housing 12 terminates slightly removed from the head end of the body 10 as at 14' to permit the feeding of the strip of paper 13 thereinto, while at opposite sides of this housing are panel portions 15, one of which bears suitable indicia, for example, numerals ranging from 1 to 20 as at 16, the indicia being in this instance preferably at the left hand side of the body 10 and in columnar order and numerically arranged.

The roll 14 of the strip of paper 13 is supported upon a spool 17 having its spindle or axle 18 journaled in brackets 20, these cut and struck upwardly from the body 10 at the portion 14 and thus the strip 13 can be fed from the spool 17 on manually turning the roll 14 in the proper direction.

The top face of the housing 12 is flat and at the end portion next to the roll 14 is provided with variably sized windows 21, 22 and 23 respectively, these being suitably identified for particular data to be scribed upon the strip 13 by the user of the device, for example, the name, the date, and the score as reckoned by such user.

The housing 12 in its top flat face is further formed with longitudinal and transverse rows of equidistantly spaced substantially rectangular-shaped openings 24, these rows being respectively identified by the data 16 in their transverse disposition, while the vertical rows are identified by the numerals ranging numerically from 1 to 5 as at 25, these numerals confronting the longitudinal rows at one end thereof while at the opposite end such rows are alternately identified by the words "True" and "False" as at 26.

Adapted to be inserted within the housing 12 to underlie a run of the strip of paper 13 is a score plate 27 which may be made from paper, metal or other material and this plate 27 upon its upper face bears distributed impressions or markings 28, these adapted to register with companion openings 24, the distribution being effected by a person giving the test in the use of the device. The plate 27 in the preparing thereof for an examination upon a problem or the like to be solved or answered must be so arranged by the placing of the impressions 28 at selected points that a person being examined will indicate by these impressions 28 whether or not that person knows the correct answer. The test plate 27 when inserted in the housing 12 and covered or concealed by the run of the strip of paper 13 thereover is sealed preferably through the medium of sealing wax 29 deposited within an aperture 30 formed in the housing 12. This blank strip 13 completely conceals the impressions 28 upon the plate 27, yet mutilating those portions of the strip 13 confronting the openings 24 will permit an exposure of the impressions 28 upon the plate 27 through such openings 24, the strip 13 being severed by a stylus or other instrument in a fashion shown at 31 in Figure 1 of the drawing. The judgment of the person taking the test that is his or her choice, is selective of any of the openings 24 for the mutilating as, at 31, of the strip 13 and in this selected judgment or choice the correctness or incorrectness thereof as to the answer by exposure of an impression 28 or non-exposure thereof will be revealed. For example, if a person taking the test by judgment or choice selects the opening 24 in the transverse row identified at the left by the numeral 1 and at the head of the longitudinal row indicated by the numeral 5, and mutilates the strip of paper 13 as at 31 and thus finds no impression 28 confronting this particular opening 24 he is instantly cognizant of the fact that he has incorrectly answered. And if repeated operation an impression 28 is exposed at the determined point of mutilation of the strip of paper 13 this is indicative of a correct answer under his or her judgment or choice. If upon exposure of all of the impressions 28, as upon the test sheet 27, the test has been completed, the examined person can check upon his judgment or choice and the score is recorded in the window 21 upon the strip of paper 13. The device is then handed to the person giving the examination or exercise and the tester removes the run of paper 13 as confined within the housing 12 and likewise the test plate 27 and the score is verified as recorded by the person being examined. The test plate 27 is replaced and the impressions 28 rearranged or they may remain as originally placed thereon within the housing 12 and a fresh or unmutilated run of the strip 13 of paper carried over this plate 27 through the housing 12 and sealed as hereinbefore set forth, the device again being ready for another test.

It is of course to be understood that the body 10, as well as the plate 27 may be made from any suitable material and in any desired size and shape. The strip 13 may also be made of any suitable material other than paper, provided the same is opaque so as to conceal the impressions 28 as may be upon the plate 27 when confined within the housing 12 of the body 10 of the device and also that will permit mutilation at the openings 24 with the strip 13 underlying the same. The seal prevents any possibility of the removal of the paper from the holder or the score plate 27 as hereinbefore described.

In Figure 5 of the drawing there is shown a slight modification, wherein there is superimposed upon the housing 12 a shutter 31', the latter being fitted at each end in a suitable guide 32 so that this shutter can be laterally shifted and it contains openings or holes 33. Holes 33 are the same shape as openings 24 and are disposed in spaced relation to each other and in rows corresponding to the vertical and transverse row dispositions of said openings 24 so that the shutter may be brought into a position for the registering of the said openings 24 and 33 and thereafter on again shifting the shutter 31' the openings 24 will be partially concealed. The purpose of this shutter is to minimize the possibility of cribbing for the purpose of cheating by a student near by the person taking the test, as for example, grouped students being subjected to a test, that is examination. Thus it will be seen that one student cannot gain knowledge or peep on the test as may be taken by another student, the shutter being a safety device.

What is claimed is:—

1. A test device comprising a relatively flat body providing a housing having a guideway therein longitudinally of same for accommodating a strip of paper and having a group of windows arranged in longitudinal and transverse spaced rows for a major extent of said housing for access therethrough to the paper, said housing being further formed with longitudinal and transverse rows of equally distanced substantially rectangular-shaped openings, indicia on the housing adjacent to said openings and heading the longitudinal rows of windows for identification purposes, a row of digits numerically arranged on said housing and consecutively aligned with the transverse rows of windows, and a test plate underlying said paper when within the housing and having its upper face bearing distributed impressions registering with the group of windows, said body further having an aperture in its upper side for sealing wax to engage said paper to hold the same in place in the housing.

2. A test device comprising a relatively flat body providing a housing having a guideway therein longitudinally of same for accommodating a strip of paper and having a group of windows arranged in longitudinal and transverse spaced rows for a major extent of said housing for access therethrough to the paper, said housing being further formed with longitudinal and transverse rows of equally distanced substantially rectangular-shaped openings, indicia on the housing adjacent to said openings and heading the longitudinal rows of windows for identification purposes, a row of digits numerically arranged on said housing and consecutively aligned with the transverse rows of windows, and a test plate underlying said paper when within the housing and having its upper face bearing distributed impressions registering with the group of windows, said body further having an aperture in its upper side for sealing wax to engage said paper to hold the same in place in the housing, and a shutter mounted for lateral sliding movement on the housing throughout the area of the windows and openings and having openings congruous therewith, the openings in the shutter for the windows being for register and non-registering relation therewith.

BRUCE KINDIG.